July 12, 1960     D. H. MALCOLM ET AL     2,944,651
FORMAT CONTROL Filed May 7, 1958     4 Sheets-Sheet 1

INVENTORS
DONALD H. MALCOLM
DONALD W. MARTIN

BY *Cushman, Darby & Cushman*
ATTORNEYS

July 12, 1960

D. H. MALCOLM ET AL

2,944,651

FORMAT CONTROL

Filed May 7, 1958

INVENTORS
DONALD H. MALCOLM
DONALD W. MARTIN

BY
ATTORNEYS

July 12, 1960  D. H. MALCOLM ET AL  2,944,651
FORMAT CONTROL

Filed May 7, 1958  4 Sheets-Sheet 3

INVENTORS
DONALD H. MALCOLM
DONALD W. MARTIN
BY Cushman, Darby & Cushman
ATTORNEYS

United States Patent Office 2,944,651
Patented July 12, 1960

2,944,651
FORMAT CONTROL

Donald H. Malcolm, Brooklyn Center, and Donald W. Martin, St. Paul, Minn., assignors to Sperry Rand Corporation, New York, N.Y., a corporation of Delaware Filed May 7, 1958, Ser. No. 733,609

17 Claims. (Cl. 197—133)

This invention generally relates to printing devices and specifically to apparatus for selectively controlling the horizontal line space format for printed copy.

The term "printing" is used herein in its generic sense and includes typing as well as printing per se. Similarly, "printing devices" includes typewriters and other printers such as line printers. Also, the term "format" as used herein refers only to the vertical spacing between successive lines of print and excludes other printing variations such as margin indentations and other print characteristics normally included by the term.

This invention may be advantageously used in the output printing equipment of a data processing system such as an automatic computer. The format or line spacing is adjusted by this invention without affecting the computer's sequence of operation, thus freeing the computer to perform other operations.

Therefore it is an object of this invention to provide improved apparatus for adjusting line spacing on a printing device.

Another object of this invention is the provision in a format control apparatus for arbitrarily selecting different line spacings on successive lines of print.

Yet another object of this invention is the provision in a format control apparatus for arbitrarily multiplying a predetermined line spacing distance between any two succesive lines of print.

Still another object of this invention is the provision in a format control apparatus of arbitrarily controlling the line spacing according to a predetermined sequence of spacings.

A further object of this invention is the provision in a line format control apparatus of selectively varying the format by manual switching means in combination with automatic switching means.

Still another object of this invention is the provision of overriding the format control sequence by an input signal means.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

This invention, as previously indicated, may be used with a print-out device associated with an electronic digital computer, communication link, or other data processing or handling systems. The invention is usable with devices having either automatic paper advance (line space) or selected paper advance. Line printers usually have automatic paper advance, whereas a typewriter's line spacing is a separate machine function. In the latter, the paper advance may be actuated in the usual manner. With either type of line spacing mechanisms, one form of the format control apparatus of this invention requires one new type of signal from the data system feeding the print mechanism. This signal, which may be the result of an electrical impulse, a contact closure, or other type of indication, may conveniently be termed a "shift format" signal, and may be obtained for example as shown in Figure 1.

Assuming the print mechanism is employed with a data processing system such as computer 10, the outputs thereof may conveniently be momentarily stored in register 12 which includes a plurality of flip-flops or the like. For purposes of explanation of the embodiment illustrated, it will further be assumed that the printing device goes through one cycle of operation when its carriage (not shown) moves from a starting point to the left, during which a line of print may or may not occur, and back to the starting point. The information for one line of print when it is to occur during a cycle is received by register 12, and at the end of each cycle the register is cleared by action of cam 14 closing switch 16 to provide an end-of-cycle signal. This signal causes an indication to computer 10 that the printing device is ready for another cycle of information. The information from the computer consists not only of the information for causing the usual printer magnets, etc., to operate, but in this case also includes a signal such as an impulse which effects, for example, a comparatively high voltage on line 18 from one of the flip-flops or the like in register 12. The signal causing this relatively high voltage may be thought of as the shift format signal above referred to, but in its initial form. The resultant high voltage signal on line 18, another form of the shift format signal, is coupled to the grid of a relay puller such as tube 20 whose plate is coupled to B+ through the coil 22 of a relay which is shunted by an impedance such as a resistance or diode 24 for noise suppression purposes. Every time a shift format signal occurs, relay 19 operates to close its associated switch 26 to effect another form of a received shift format signal, or an indication of the receipt thereof, usable with the invention in the manner later described. The clearing of register 12 by closure of switch 16 removes the relatively high voltage on line 18 and operates to reopen switch 26.

It is to be understood that the shift format signal from computer 10 is not received during every cycle of information, but only some of the times when it is desired to shift the format of the printing mechanism. When the shift format signal does occur, it occurs during the last cycle or line of a given format.

Figures 1, 2:
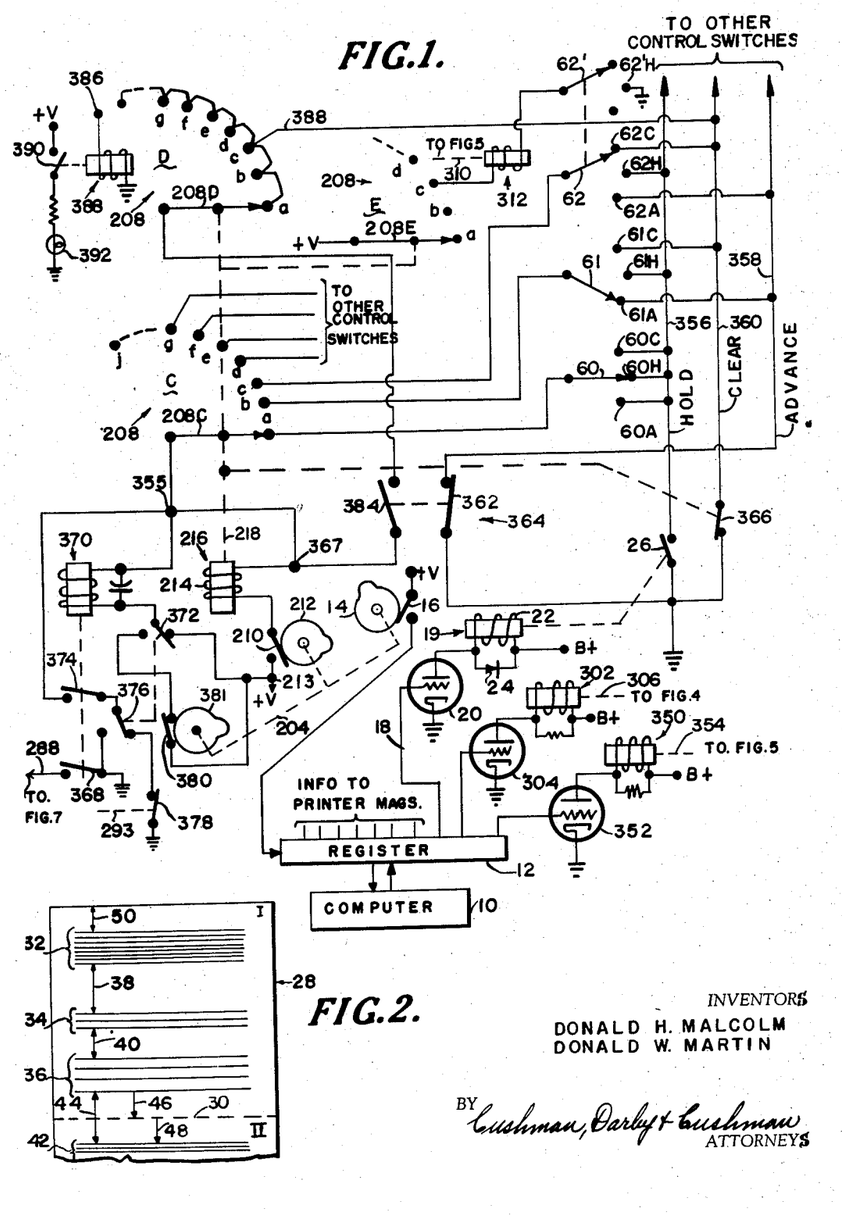
Figure 1 is a schematic of exemplary electrical control circuits for use with this invention.
Figure 2 is an exemplary format obtainable by the use of this invention.

An exemplary format is shown in Figure 2 on hard copy 28 which includes page I and a portion of page II interconnected in the usual manner along dotted line 30. Each of the solid horizontal lines on pages I and II represents printed information. Lines 32 are single spaced, lines 34 are double spaced, and lines 36 are triple spaced. Any arbitrary number of lines may be included in each of these formats, and further, any arbitrary number of line spaces may be included in the spacing 38 between the single and double spaced lines, as well as in space 40 between the double and triple spaced lines. Likewise, any arbitrary number of line spaces may be included between the triple space lines 36 and the single space lines 42. This spacing is designated by the numeral 44 and includes the space 46 from the bottom of lines 36 to the page separating line 30 as well as the space 48 from line 30 to the first of the single space lines 42. The spacing 48 shown on page II is the same as the spacing 50 shown on page I. In this manner, the format on each page begins at the same place relative to the top of the page, and the intra-page format may be determined by the apparatus of this invention.

Figure 3:
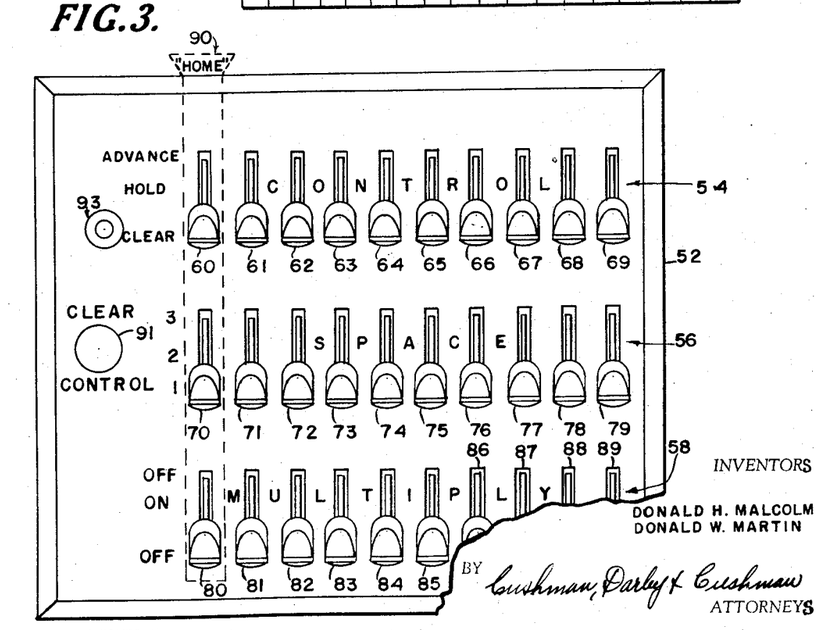
Figure 3 illustrates an exemplary keyboard.

An exemplary format control keyboard 52 for manually determining the sequence spacing in the format is shown in Figure 3. Each control switch in the group thereof in row 54 is associated with the other two switches respectively in rows 56 and 58 in the same vertical column. That is, control switch 60 is associated with switches 70 and 80, switch 61 with switches 71 and 81, switch 62 with switches 72 and 82, etc., each column including three switches as a set. Switches 70 through 79 in row 56 determine the number of line spaces the paper is to advance per paper advance. Each of these switches is movable to a plurality of positions respectively indicating the number of lines per advance. For example, each switch is movable between three positions the first of which indicates an advance of 1 line space, the second, 2 line spaces; and the third, 3 line spaces. Therefore, the switches in row 56 determine whether the paper advance is to be 1, 2 or 3 spaces. Switches 80 through 89 in row 58 determine the number of paper advances per machine cycle. These switches are termed "multiply" switches in that the line spacing designated by the associated switch in row 56 is multiplied by a predetermined number corresponding to the setting of the associated switch in row 58. In the exemplary embodiment herein discussed, the line space setting is multiplied by 3 when the multiply switch is at its "on" position and by 1 when at its "off" position. Thus, as between associated switches in rows 56 and 58, there can be caused a line spacing of 1, 2, 3, 6 or 9 spaces per paper advance.

The switches in row 54 function as control switches. It will be noted that there are ten columns or sets of three switches, and each column may designate an arbitrary portion of a total format. Each of the control switches in row 54 are movable to three positions termed "advance," "hold," and "clear." When a control switch is in its "hold" position, the line spacing as designated by the space and multiply switches in the same column is maintained for each cycle (one cycle including only one line of print when printing occurs) until a shift format signal is received in the last line or cycle of that portion of the format. At this time, the column of switches to the immediate right are employed to control the succeeding format portion. When a control switch in row 54 is in its "advance" position, the paper is advanced the number of lines designated by the other two switches in the same column, after which the column of switches to the immediate right are employed. Stepping from one column of switches to the next may be accomplished by an electromechanical stepping switch, as will hereinafter be described, to effect any desired intra- and inter-page formats.

In accordance with the foregoing explanation of the control switches, it becomes apparent that if two groups of printed data are desired to be separated by ten blank lines, four columns of switches may be set up as follows to cause the desired result, this being effected automatically as will be later described in detail: the leftmost column, for example the "home" column 90 including switches 60, 70 and 80, are set to provide the format for the first group of data. Assuming a double spaced format for the first group of data, switch 60 is positioned at "hold," switch 70 at its "2" position, and switch 80 at its "off" position. Switches 61 and 62 are placed in their "advance" positions, while switch 63 is placed in its "hold" position. Switch 71 is positioned at "3," switch 81 at "on," switch 72 at "1," and switch 82 at "off." Switch 70 being in its "2" position automatically causes the first group of data to be double spaced. When a shift format signal appears during the last cycle or line of the first group of data, a paper advance of ten spaces is caused automatically. As described above, a nine (3×3) line paper advance is accomplished through the settings of switches 61, 71 and 81, then the control is stepped to switch 62. A single line paper advance then occurs and the control is further stepped to switch 63 which holds the format spacing designated by switches 73 and 83 for the format of the second group of data.

Assuming that the above description fulfills format requirements of one page of printed material, switches 64 through 69, 74 through 79 and 84 through 89 merely cause the print-out device to advance the paper to the next attached page. A shift format signal causes the control to be stepped to switch 64, which is either in its "advance" or "clear" position. For example, if eighteen line spaces were desired in the spacing designated by numeral 44 of Figure 2, control switches 64 and 65 would be in the "advance" position and their associated switches 74, 84 and 75, 85, respectively, would cause a paper advance of nine spaces each, totaling eighteen line spaces. This latter paper advance places the paper in the proper position for starting to print the first line of page II. Switches 66 through 69 are consequently positioned at "clear." In this position, each of these control switches cause the respective columns of switches to be passed by without any action, i.e., each of these columns of switches is effectively disabled regardless of the setting of switches 76—79 and 86—89. Thus, the control is stepped automatically through the last four columns without effecting any format control. After stepping by switch 69, the stepper returns to the "home" column 90 or first set of switches which determine the format spacing of the first group of data on any page of print. If an operator wishes to return control to the home column at any time during an operation, he need only depress the "clear control" push button 91 which, as will be later explained, causes fast stepping from one column of switches to the next the same as do control switches in their "clear" position. Upon stepping to the last column, i.e., the column with switches 69, 79 and 89, lamp 93 is caused to be lighted indicating that the apparatus is ready to step to the "home" column and will so do automatically if switch 69 is in its "clear" position and push button 91 is not depressed. When using push button 91 for clearing, release thereof causes stepping from the last to the home column.

All the foregoing will become more apparent to those skilled in the art from the following description of an exemplary embodiment, and it will be noted that the format can be modified merely by an operator manually setting the switches to the respective positions desired. This provides the advantage of eliminating the tiresome conventional process of repunching tape, inserting cams, and the like normally required to change format. Another advantage is that an operator may determine the best format merely by experimenting with several formats easily obtained by setting and resetting the switches.

Figures 4, 7:
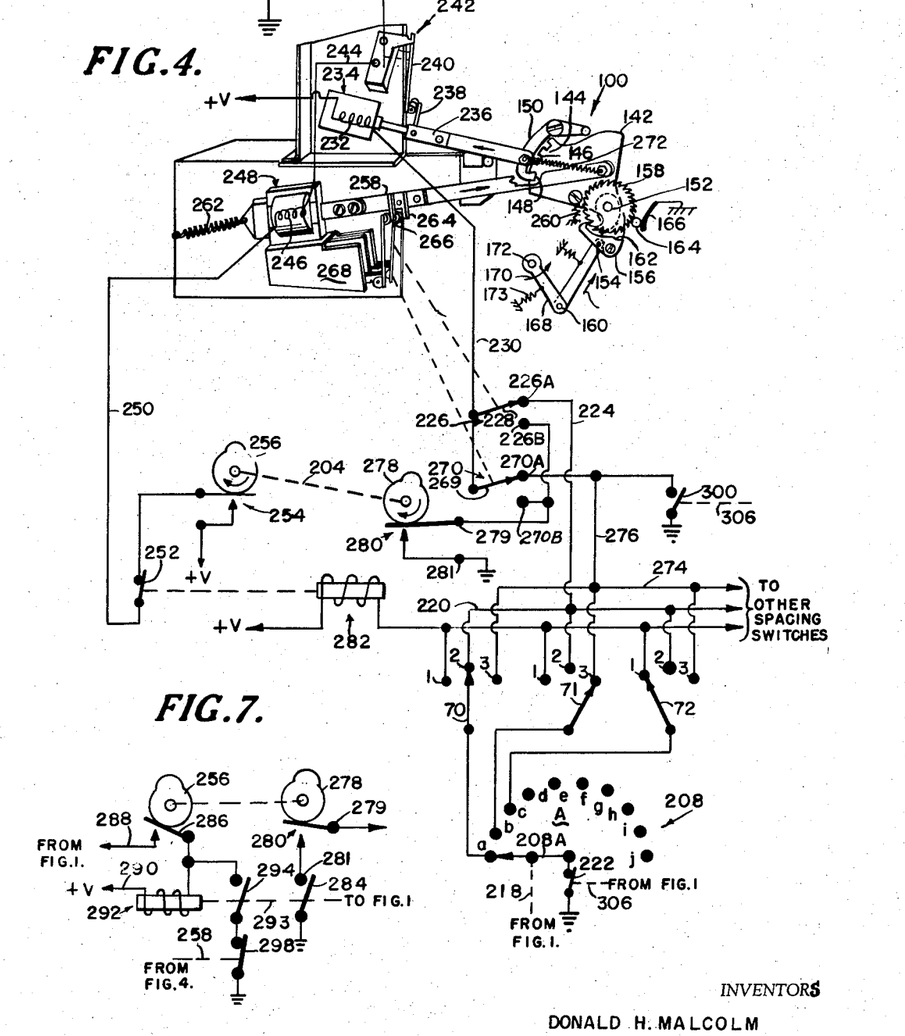
Figure 4 is an illustration of an exemplary line spacing effectuating apparatus.
Figure 7 illustrates apparatus for modifying the performance of the apparatus illustrated in Figure 4.

The usual parts of a line spacing selector of conventional printing devices may take, for example, the form of the mechanical line spacing selector 100 of Figure 4, limitation being necessarily intended by the particular conventional embodiment thereof shown. Mechanical portions of this line spacing selector include step selecting means such as three tooth sector 142 movable to a plurality of stable positions by virtue of three notches 144, 146 and 148 into which the finger of selector pawl 150 may be selectively placed for locking purposes. Tooth sector 142 rotates about the axis of shaft 152 and has an arm 145 (shown in dotted lines most clearly in Figure 4A) extending downwardly and curving to the left ending in a right angled lug 143. The printer platen (not shown), to which is rigidly attached ratchet wheel 158, is connected directly to shaft 152. Rotatably mounted on shaft 152 is a pawl support arm 153 on which the platen shift pawl 154 is pivotally mounted by screw 156. Lug 143 engages one side of arm 153 and causes the latter to move counterclockwise when sector 142 moves counterclockwise. Pawl 154, which is pivotally mounted on arm 153 by screw 156, also moves counterclockwise but does not substantially rotate counterclockwise about screw 156 because of its pivotal connection at 159 to link 160 which is maintained in position by spring 157. The plurality of teeth around ratchet wheel 158 are so spaced that movement of the ratchet wheel, and consequently of the platen, one tooth space, i.e., one step, equals one line space of paper advance. The number of lines or steps advanced at any one time is determined by the number of teeth which the platen shift pawl 154 "grabs" during its movement in a counterclockwise direction. When selector pawl 150 is in notch 144, which may be termed the "1" notch for one line spacing, shift pawl 154 is in its rightmost unactuated position. Actuation of shift pawl 154 is caused by movement of link 160 upwardly to the right, in the general direction of arrow 161, which effects contact between shift pawl 154 and a tooth on ratchet wheel 158. When the ratchet wheel has moved one tooth space, or one step equaling one line advance, the curved surface 162 on pawl 154 abouts against circular stop 164 and forces same in between two adjacent teeth on ratchet wheel 158. This stop is normally biased against the ratchet wheel by spring 166, but the additional force of the shift pawl 154 against the stop is necessary to stop rotation of the ratchet wheel.

When selector pawl 150 is in notch 146 of tooth sector 142, shift pawl 154 is positioned to cause the ratchet wheel to rotate two steps equaling two line spaces when link 160 actuates the shift pawl. Likewise, disposition of selector pawl 150 in notch 148 causes shift pawl 154 to rotate the ratchet wheel and the attached platen three steps which equals three line spacings.

Figures 4A, 5:
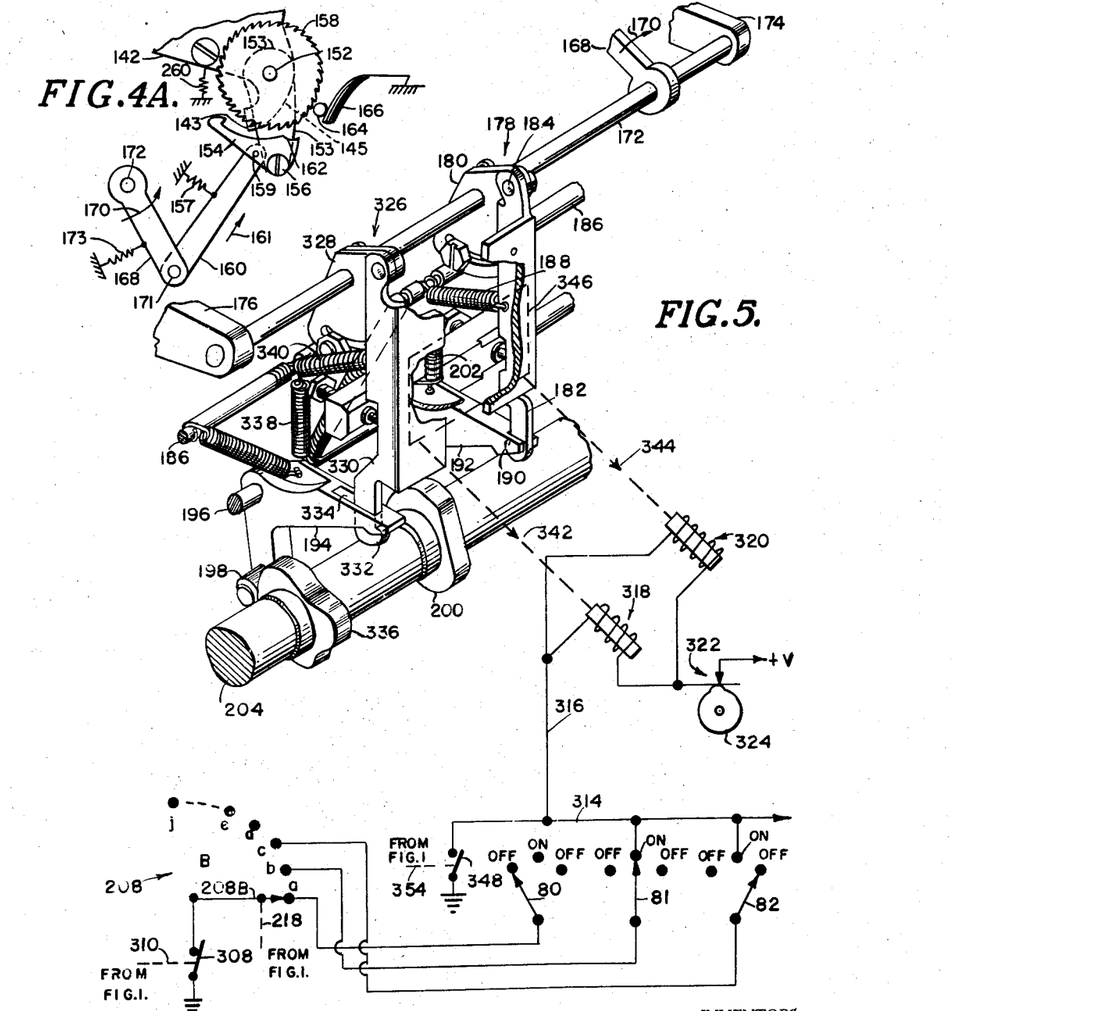
Figure 4A is an enlarged view of a portion of Figure 4.
Figure 5 is a sketch showing an exemplary mechanical portion of the line space multiplying apparatus in isometric projection with a schematic of associated electrical circuits.

Movement of link 160 is caused by rotation of the attached arm 168 in the direction indicated by arrow 170. Link 160 and arm 168 are pivotally connected together by pin 171. Arm 168 is rotatable with shaft 172 and both are biased clockwise by spring 173 causing the pawl support arm 153 to remain in engagement with lug 143 except when link 160 is moved in the direction of arrow 161 for actuation of shift pawl 154. As shown in Figure 5, shaft 172 is rotatable in bearings disposed in the fixed end supports 174 and 176. Directly attached to shaft 172 is a latch hook assembly 178 including plate 180 and latch hook 182 joined by pivot 184. The latch hook 182 is normally urged toward shaft 186 by spring 188, so that hook or finger 190 catches on rocker arm 192 when the latter moves downwardly. Rocker arm 192 is similar to rocker arm 194 and both pivot about shaft 196. Rocker arm 192 has a cam follower (not shown) similar to cam follower 198, and follows single lobe cam 200. Spring 202 is connected between shaft 186 and rocker arm 192 so as to urge the cam follower attached to rocker arm 192 against cam 200. This causes rocker arm 192 to be disposed in a predetermined position relative to finger 190 when the cam follower associated with the rocker arm is not in contact with the lobe on cam 200. The normal vertical spacing between hook 190 and the portion of rocker arm 192 which contacts same when the rocker arm is rocked by cam 200, is determined, through arm 153, pawl 154, link 160, arm 168 and shaft 172, by the position of tooth sector 142 of Figure 4. When pawl selector 150 is in the "1" notch 144, hook 190 in Figure 5 is set furthest in a vertical sense from rocker arm 192, while when pawl 150 is in the "3" notch 148, hook 190 is set closest to rocker arm 192. Therefore, upon rotation of shaft 204 in Figure 5, the rocking of rocker arm 192 by the lobe on cam 200 pulls the end of rocker arm 192 downwardly so as to catch on finger 190 and move latch hook 182 and consequently the connected mechanism including shift pawl 154 (Figure 4) and the platen, the number of line spaces set by the positioning of selector pawl 150 relative to tooth sector 142.

The relative positions of selector pawl 150 and tooth sector 142 may be determined by the electrical apparatus shown in Figure 4. That is, the mechanical line spacing of the selector apparatus is electrically adjusted to correspond to the switch settings on the format control keyboard of Figure 3, the illustration in Figure 4 being directed toward the adjustment means utilizing the line spacing switches 56 of Figure 3. Switch arms 70, 71 and 72 of Figure 4 correspond to the like elements in Figure 3, and each is manually movable between positions 1, 2 and 3 which as previously indicated corresponds respectively to the number of lines or steps that the platen and paper are to be advanced at a given time. Each of the switch arms is connected to a different terminal of one gang of a multi-gang electromagnetic stepping switch. Figure 4 illustrates one bank or gang A of the stepping switch which is generally designated 208, the other banks or gangs thereof being illustrated in other figures. Each such gang is electrically independent and has its own switch arm such as arm 208A movable successively to a plurality of terminal positions designated $a, b, c \ldots j$ corresponding respectively to the ten columns of switches shown in Figures 3. That is, when arm 208A is in position $a$, electrical connection to the "home" column spacing switch 70 is made. Whereas, when arm 208A is at position $b$, electrical connection with switch 71 is made, etc., thereby allowing sequential energization of the line spacing switches.

Movement of arm 208A from one position to another is effected by the circuitry shown in Figure 1 as will be hereinafter explained more fully. Briefly, closure of switch 210 in Figure 1 by the lobe on cam 212 connects $+V$ from terminal 213 to coil 214 of stepping solenoid 216. This solenoid has an armature 218 shown by dotted line which moves the respective independent arms of the different gangs of stepping switch 208. Whether or not solenoid 216 is actuated upon closure of switch 210 during a given cycle of cam 212, is dependent inter alia upon the position of one of the control switches 54 (Figure 3) at that time, as will be more fully explained later.

Reference to Figure 4 again, shows switch 70 at its "2" position. Therefore, when switch arm 208A is at position $a$, a circuit from line 220 to ground through the normally closed switch 222 is made. Line 220 further connects to the common "2" position line 224 which is connected to terminal 226A of switch 226. Arm 228 of this switch is movable between its two positions 226A and 226B, and is connected by line 230 through the coil 232 of solenoid 234 to a source of positive potential. The armature 236 of solenoid 234 is coupled to selector pawl 150, and also carries a switch actuating arm 238. Energization of solenoid 234 causes movement of armature 236 to the left, thereby unlocking the step selecting means by removing the finger of selector pawl 150 from whatever notch of tooth sector 142 that it happens to be in. Such movement of the armature, also causes switch actuator arm 238 to move against a spring arm 240 of control switch 242. This completes a circuit from line 244 through the switch to ground. At its opposite end, line 244 connects to coil 246 of solenoid 248. The coil otherwise is coupled by line 250 through normally closed relay switch 252 to cam operated switch 254. The other terminal of switch 254 is coupled to a source of potential which energizes solenoid 248 when the lobe of cam 256 closes switch 254.

The armature of solenoid 248 is coupled to tooth sector 142 by linkage 258. In response to the unlocking of the step selector 142 by solenoid 234, solenoid 248 is energized and causes linkage 258 to move to the right, thereby rotating tooth sector 142 clockwise. It is to be understood as will later be more fully explained that tooth sector 142 is always rotated from its "1" position (i.e., from its position wherein the finger of pawl 150 may be disposed in the "1" notch 144) to its "2" or "3" position by linkage 258 when solenoid 248 is actuated, though this may not be every cycle. Linkage 258 carries two switch actuating arms 264 and 266. These arms respectively actuate the control switches in switch assembly 268, such control switches being shown schematically as switches 228 and 270. The switch actuating arms 264 and 266 are disposed along linkage 258 at spaced apart positions and cause actuation of switch arms 228 and 269 (the latter being a part of switch 270) respectively at different times. Upon movement of linkage 258 to the right, switch arm 264 operates switch 226 before switch arm 266 operates switch 270. The position of switch actuating arm 264 along linkage 258 is such that switch arm 228 is operated so as to move from terminal 226A to 226B when tooth sector 142 is in such a position that the finger of selector pawl 150 may be forced by spring 272 into the double space notch 146 upon the de-energization of solenoid 234. Since terminal 226B is not connected directly to ground by virtue of switch 280 not being closed at that time, solenoid 234 is de-energized and spring 272 forces the finger of pawl 150 into the "2" notch.

However, if arm 208A of the stepping switch had been at position b so as to complete a ground circuit to switch 71 which is disposed at its "3" position, line 274 as well as line 276 and switch arm 269 via its terminal 270A would have been connected in the complete circuit of coil 232. In this instance, the actuation of switch arm 228 by actuator 264 is of no avail, and linkage 258 rotates tooth sector 142 further until the actuator arm 266 operates switch arm 269 from its position 270A to its alternate position 270B. The circuit for solenoid 234 is thereby broken and the position of tooth sector 142 is such that the finger of selector pawl 150 is forced into the "3" spacing notch 148.

As above mentioned, the lobe on cam 256 operates switch 254. In like manner, the lobe on cam 278 operates switch 280. Both of these cams are operated in synchronism and are preferably disposed on, or operated by, shaft 204 of Figure 5, as indicated by dash line 204 in Figure 4. Shaft 204 may be considered as a timing shaft, one revolution thereof being one cycle of operation equivalent to the movement of the printer platen to the left and back again including the vertical spacing movement thereof. During any given cycle, cam 256 closes switch 254 at the beginning of the cycle, while cam 278 closes switch 280 at the end of the cycle. An exemplary timing chart for the operation of the different switches in Figure 4 is shown in Figure 6.

Figure 6:
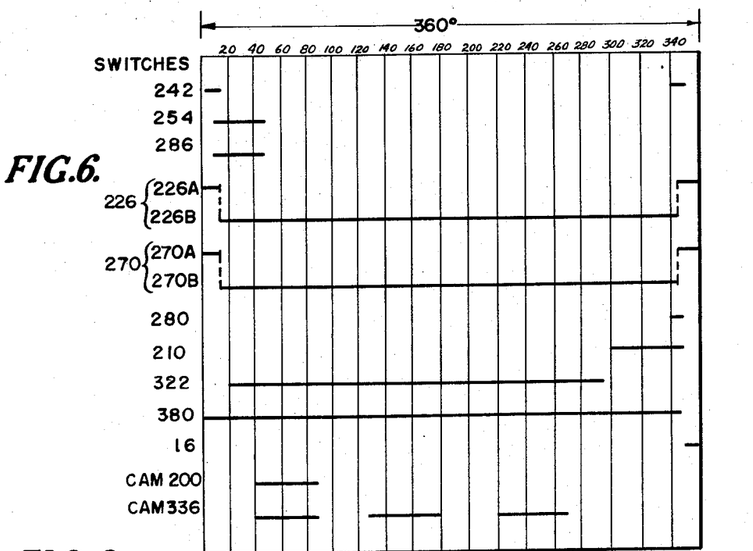
Figure 6 is a chart showing exemplary switch and cam operations during one cycle.

Reference to Figure 6 indicates that during the first portion of a given cycle, i.e., when stepping switch arm 208A first moves to a given position and the associated spacing switch is at position "2" or "3," solenoid 234 is immediately energized to soon cause closure of switch 242. During the time switch 242 is closed, cam 256 closes switch 254 and holds same closed for a short period of time sufficient to allow proper movement of tooth selector 142. When the one of switch arms 228, 269 which is then connected to ground is operated, so as to move from its A to its B position, solenoid 234 is de-energized. Following this, and as shown in Figure 6 during the 40° to the 90° portion of the cycle for example, cam 200 of Figure 5 causes rotation of ratchet wheel 158 and its platen the number of steps set by the corresponding line space control switches. The following portion of a cycle, for example from 100° to approximately 300°, may be employed for printing in accordance with the combined information signals from the computer. Alternatively, this portion of the cycle may be employed to cause the platen to rotate again and again if desired, each such successive rotation being a like group of steps so as to advance the paper a like number of lines in accordance with the setting of the associated multiply switch, all as will be later explained. Toward the end of the cycle, the lobe of cam 278 closes switch 280. The closure of this switch completes a circuit from ground at terminal 281 through switch arm 228, and also through switch arm 269 if same has also been operated, to solenoid 234. This again energizes solenoid 234 and removes the finger of selector pawl 150 from whatever notch it may be in. By action of springs 260 and 262, tooth sector 142 is rotated counterclockwise so as to position the "1" notch 144 for receipt of the finger of pawl 150 when cam 278 opens switch 280 and de-energizes solenoid 234.

It is therefore apparent that during each cycle of operation, when any of the basic line space control switches in row 56 of Figure 3 is in either its double or triple space position, that tooth sector 142 is moved to a corresponding position during the first portion of the cycle, and is moved back to its "1" positions during the latter portion of the cycle.

Since in the embodiment so far described the tooth sector is always moved back to its "1" position at the end of each cycle, the "1" position of each of the basic line space control switches 70 through 79 need not be electrically connected into the circuit. However, if it is desired to prevent movement of tooth sector 142 (even though solenoid 234 should be energized in one manner or another) when a line space switch is in its "1" position, the coil of relay 282 may be coupled to each of the "1" positions of each of the line space switches. Therefore, when switch 72 for example is at its "1" position, relay 282 is energized so as to open its switch 252 and positively prevent energization of solenoid 246.

Thus it is seen the line spacing selection of one of the spacing switches 70—79 is automatically imposed on the print-out cycle of each paper advance. It is to be understood, however, that the cyclic recurrent movement of tooth sector 142 from its "1" position to one of its other positions and back to the "1" position is not an essential in accordance with this invention, since the apparatus of Figure 7 may be employed to cause tooth sector 142 to remain in the proper line spacing position throughout several machine cycles until a shift format signal occurs or a control switch 60—69 is in its "advance" position.

In Figure 7, cam 278 is still employed to operate switch 280, but terminal 281 of this switch is no longer connected directly to ground; instead, it is connected through a relay switch 284 to ground. Consequently, only when relay switch 284 is closed, does the closure of switch 280 by cam 278 cause energization of solenoid 234 whereby tooth sector 142 is returned to its "1" position. Closure of switch 280 in Figure 4 causes unlocking of the position of tooth sector 142 unconditionally, but in Figure 7 such closure meets only one of the conditions necessary for such unlocking.

In Figure 7, cam 256 is employed to operate not only switch 254 of Figure 4, but also switch 286. When this switch is closed, a circuit from line 288 to a positive potential on line 290 is completed through the coil of relay 292. This relay by virtue of its armature 293 actuates not only switch 284, but also switch 294 which provides a ground path from line 296 through switch 298, effecting a hold circuit whereby opening of switch 286 is ineffective to de-energize relay 292. As will be later explained in detail, line 288 is effectively connected to ground each time a shift format signal is received from computer 10 in Figure 1, or whenever any one of the control switches 60—69 in Figure 3 is in its "advance" position. Such advance and shift format indications, when present, start at the beginning of a cycle so that cam 256 always effects energization of relay 292 during such cycles. Consequently the subsequent rotation of cam 278 to cause closure of switch 280 effects returning of tooth sector 142 in Figure 4 to its "1" position in the manner aforedescribed.

Switch 298 in the relay holding circuit of Figure 7 is operative by linkage 258 of Figure 4 so that the switch is closed at all times except when the finger of selector pawl 150 is in the "1" notch 144. When such is the situation, any energization of relay 292 has a duration only equal to that of the time during which switch 286 is closed. Consequently, when cam 278 subsequently closes switch 280, switch 284 is open and no circuit is completed therethrough. Tooth sector 142 remains in its "1" position at such times.

It is therefore apparent that tooth sector 142 may remain at either a "2" or "3" position during a plurality of cycles and until a cycle in which line 288 is connected to ground potential. When relay 292 is energized by closure of switch 286 and remains energized throughout the closure of switch 280, tooth sector 142 is then returned to its "1" position. In a subsequent machine cycle, a new line space selection is effected in accordance with the appropriate ones of the switches in rows 56 and 58 thereof in Figure 3.

In addition to the above features of this invention, provision is made for override of the format control apparatus. This provision includes simultaneous closure of switch 300 in Figure 4 with the opening of normally closed switch 222. Switch 222 opens any possible ground circuit through one of the line spacing switches 70, 71, 72, etc., while the closure of switch 300 provides a ground path to one of switches 226, 270, the illustration being to the latter. Closing of switch 300 effects a triple space selection in the same manner as described for setting of switch 71 to its "3" position. Operation of switches 222 and 300 may be accomplished, as shown in Figure 1, by receipt from computer 10 of an appropriate signal which actuates relay 302 via tube 304. The armature 306 of this relay is connected to both of switches 222 and 300. When the apparatus of Figure 7 is included in the circuitry, appropriate signals may be similarly provided to cause resetting of tooth sector 142 to the single space position. That is, a switch operated by a similar relay arrangement may be placed in parallel with switch 284 of Figure 7 so as to connect switch 280 to ground whenever it is desired to cause return of tooth sector 142 to its "1" position automatically by a signal from the computer. It is obvious from the foregoing, that any line space selection can be accomplished in a similar manner by signals direct from the data processing system. This selection can be designated for only one machine cycle or for an indeterminate number of cycles in the same manner that the format control switches determine line space settings of tooth sector 142.

As previously indicated, switches 80—89 of Figure 3 are for the purpose of causing multiplication of the basic line spacing set by the switches 70—79. As a representative example, the apparatus of Figure 5 shows an embodiment wherein the multiplication factors are one and three. It is to be understood, however, that other multiplication factors may be used as will become obvious from the following description.

In Figure 5 multiplication switches 80, 81, 82, etc., are connected respectively to terminals $a$ through $j$ of bank B of the multi-gang switch 208. Arm 208B is stepped by armature 218 of relay 216 in Figure 1 the same as is arm 208A of gang A in Figure 4. At each position, arm 208B connects one of the multiply switches to one terminal of switch 308, the other terminal of which is connected to ground. Switch 308 is operated by the armature 310 of relay 312 in Figure 1, in a manner to be hereinafter described. Since the type of printing device with which this invention is being described is one wherein the line space multiplying feature is not to be used during any cycle in which printing is supposed to occur, it is desirable to employ switch 308 to prevent successive multiplying rotations of the platen since otherwise they would occur while printing was taking place. However, in printing devices wherein the machine cycle is sufficiently long to allow the successive multiplying paper advances before printing begins, or wherein two cycles are utilized and the same may be accomplished, or in any similar arrangement whereby multiplication can occur before printing starts, switch 308 is unnecessary. To prevent successive actuations of the platen during the time that a line is being printed by the printing device, switch 308 may be held open by one of a plurality of relays such as relay 312 in Figure 1 whenever the associated control switch 60—69 of Figure 3 corresponding to the position in which stepping switch arm 208B is located, is in a "hold" position. A control switch in its "hold" position indicates that printing is to occur, and such printing is to be at single, double or triple spacings in accordance with the associated line spacing switch, and not at any multiplied spacing. This is a limitation arbitrarily set forth, and it is obvious that in accordance with this invention, printing may occur at multiplied spacings when the timing is thus as to permit same.

The first multiplication type switch 80 is accordingly not electrically connected at any one of its positions to line 314, since in this embodiment switch 80 is in the "home" column for which printing is arbitrarily designated as to occur always. Switch 81 is shown in the "on" position, and when arm 208B is at position $b$ and switch 308 is closed, a circuit to ground is completed from line 316. This line connects in parallel to coils of solenoids 318 and 320 which further connect to switch 322. The other terminal of this switch is connected to a source of potential so that when the lobe of cam 324 closes switch 322, solenoids 318 and 320 are energized. Cam 324 may be coupled to or disposed on timing shaft 204 so as to rotate synchronously with the other cams thereon or driven thereby.

Besides latch hook assembly 178, a similar latch hook assembly 326 is connected to shaft 172 as by plate 328. The latter latch hook assembly further includes the vertically disposed latch hook 330 which has a hook or finger 332 inserted through aperture 334 of rocker arm 194. Cam follower 198 of rocker arm 194 is positioned to ride on cam 336 and is urged thereagainst by spring 338. The number of lobes on cam 336 equals the multiplication factor, and as illustrated, cam 336 has three lobes, meaning that any line spacing set by any one of switches 70—79 in Figure 3 may be multiplied by 3 if the corresponding multiply switch is "on." Each time follower 198 is raised by a lobe, the portion of rocker arm 194 adjacent latch hook 330 moves downward. Normally, latch hook 330 is urged toward shaft 186 by spring 340 so that finger 332 will not be caught by the moving rocker arm 194. However, when solenoid 318 is energized, latch hook 330 is pulled in the direction of arrow 342 so that the end of rocker arm 194 contacts finger 332 each time the rocker arm is moved by a lobe on cam 336. This causes the ratchet wheel 158 of Figure 4 and its associated platen to rotate successively three times, each rotation being the number of steps or lines determined by the corresponding line space selection switch 70–79. To prevent interference by cam 200 and its associated rocker arm 192 and latch hook assembly 178, the energization of solenoid 320 pulls latch hook 182 in the direction indicated by arrow 344 so that finger 190 does not hook onto rocker arm 192 when the latter is rocked by the lobe of cam 200.

A mechanical interlock may be provided to prevent latch hooks 182 and 330 from engaging rocker arms 192, and 194 respectively at the same time during a printing cycle. This interlock may comprise attaching a stiff metal plate to latch hooks 182 and 330, as shown by dash line 346. This metal plate may be the armatures of solenoids 318 and 320. Then, when solenoid 318 is energized and latch hook 182 does not disengage (e.g., sticks to) rocker arm 192, interlock plate 346 pushes latch hook 182 to the disengaged position. Similarly, when solenoid 318 is de-energized and latch hook 330 sticks, spring 188 assists spring 340 in disengaging latch hook 330 by exerting a force on the interlock plate 346. As shown in Figure 6, the lobe on cam 324 is sufficient to maintain switch 322 closed for a substantial portion of a cycle, for example, from 20° through 280°.

If desired, a hold and release mechanism similar to the apparatus of Figure 7 may be employed to replace the arrangement relating to the switching of solenoids 318 and 320. As shown in Figure 5, solenoids operate positively in the direction of arrows 342 and 344, whereas operation in the opposite direction is by springs 188 and 340. If positive solenoid operation is desired in the reverse direction, one of the solenoids may be connected to another switch so as to cause both of latch hooks 182 and 330 to be forced toward shaft 186. Each of the solenoids may then operate a switch in such a manner as to maintain current to the solenoid coils during operation thereof, followed by relay actuation of a release switch. In addition, some printers may require that solenoids 318 and 320 operate at different times, and this may be provided as just described by the energization of the solenoids through separate cam operated switches rather than through the single switch 322.

As is apparent from the foregoing, a multiplied line spacing may be selected by the respective switches 80—89. However, such selection may be overridden by the data processing system when it operates to close switch 348 connecting line 314 in Figure 5 to ground. Whenever information is received from computer 10 of Figure 1 to cause actuation of relay 350 via relay puller tube 352, the armature 354 of relay 350 closes switch 348 in Figure 5, thereby establishing a circuit to ground from line 316. Consequently, multiplication occurs when switch 348 and switch 322 are closed simultaneously regardless of the setting of the multiply switch otherwise then in use. Multiplication in this manner can be accomplished for a single machine cycle or an indeterminate number of cycles in accordance with the information from computer 10.

Thus, it is seen that any combination of line spacing can be arbitrarily selected by either the format control keyboard of Figure 3, either directly or by the connecting data processing system.

The scanning and control sequences of an exemplary embodiment of the format control may be set into operation by manual setting of the control switches 60—69 to one of their three positions. Control switch 60, which is in the "home" column, is always electrically connected to the "hold" position regardless of its mechanical setting, whenever the apparatus of this invention is employed to effect printing in the first area 32 (Figure 2), which printing is then in accordance with the settings of switches 70 and 80.

With reference again to Figure 1, exemplary sequencing apparatus is illustrated for controlling the above described format control. Control switches 60, 61 and 62 are shown in Figure 1 as being respectively in their "hold," "advance" and "clear" positions. Each of these switches is connected to a different terminal representing the different positions of gang C of switch 208. When switch arm 208C is at position a, a circuit is completed from junction 355 to the "hold" line 356 regardless of which position switch 60 is in, since each of its terminals 60C, 60H and 60A is connected to line 356. However, when arm 208C is in position b, switch 61 may complete a circuit from junction 355 either to the "hold" line 356 by its terminal 61H, or to an "advance" line 358 by terminal 61A, or to "clear" line 360 by terminal 61C. Likewise, the terminals of switch 62, as well as other control switches, are respectively connected to lines 356, 358 and 360. Line 356 further connects through the normally open relay switch 26 to ground, while line 358 further connects through a normally closed switch part 362 of a "clear" switch 364 to ground, and line 360 similarly connects to ground via another normally closed switch 366.

As shown in Figure 1, the coil 214 of solenoid 216 is connected via junctions 367 and 355 to arm 208C of the stepping switch. Cam 212, as previously mentioned, closes switch 210. This cam as well as cam 14 and cam 368 are preferably on the main timing shift 204 of Figure 5, or are driven thereby. As shown in Figure 6, switch 210 is closed toward the end of the cycle, for example, from 300° to 350°. The closure of this switch connects terminal 213 and a positive potential +V to coil 214 to actuate solenoid 216 when the control switch 60, 61, etc., with which arm 208C is then associated, is positively connected to ground.

As above indicated, regardless of which position switch 60 is in, it is always connected to the "hold" line 356 so as to allow printing to occur for one or a plurality of lines. During the last line of such printing, computer 10 sends out a shift format signal so as to raise the potential on line 18 and cause actuation of relay 19. This closes switch 26 at the beginning of the last line or cycle of printed matter in the first area thereof on a page, such as the plurality of lines 32 in Figure 2. Toward the end of this line or cycle, the lobe on cam 212 closes switch 210. Since a circuit is then complete from terminal 213 at which +V is applied through switch 210, coil 214, junctions 367 and 355, switch arm 208C when at position a, switch 60, line 356 and switch 26 to ground, relay 216 is energized. This energization may occur, for example, as shown in Figure 6 from 300° through 350° of the cycle. Upon release of switch 210 by cam 212, the relay is de-energized and switch arm 208C moves to position b.

If the embodiment of Figure 4 is employed without the modification shown in Figure 7, no further use is made of the shift format signal. However, when the modification of Figure 7 is employed, line 288 thereof is connected to switch 368 in Figure 1. The other terminal of this switch is connected to ground. Since the shift format signal causes switch 26 to close at the beginning of a cycle, a circuit from ground through switches 26 and 60, stepping arm 208C when in position a, to junction 355 is further completed through the coil of relay 370 to the positive potential at terminal 213 for actuation of relay 370 when switch 372 is thrown to the right, as shown. Relay 370 closes switch 368 and also switch 374. The latter switch is connected in a relay holding circuit through switch 376, which is in its right position when switch 372 is also in its right position, and through normally closed switch 378. Switch 378 is operated by the armature 293 of relay 292 in Figure 7, but the operation is such that switch 378 is opened only momentarily when relay 292 is de-energized. At all other times, switch 378 is closed. Therefore, as soon as a shift format signal causes operation of relay 370, at which time switch 378 is closed, the relay is held energized by the closure of its switch 374. The connection of line 288 to ground by the closing of relay switch 368, provides the necessary reference potential to allow energization of relay 292 in Figure 7 when the lobe of cam 256 closes switch 286 toward the beginning of a cycle. Then, towards the end of the cycle, when the lobe of cam 278 closes switch 280, the finger of selector pawl 150 of Figure 4 is removed from whatever notch it happens to be in, excepting the "1" notch 144, so as to allow return of tooth sector 142 to its "1" position. As previously described, the movement of linkage 258 by force of springs 260 and 262 causes switch 298 in Figure 7 to open when tooth sector 142 reaches its "1" position. Opening of switch 298 de-energizes relay 292, thereby opening its switches 284 and 294 and momentarily opening switch 378 in Figure 1. The opening of switch 378 causes de-energization of relay 370 and removes ground potential from line 288.

An alternative embodiment for causing line 288 to be connected to ground upon the occurrence of a shift format signal, is shown in Figure 1 and is such that when switches 372 and 376 are thrown to the left, relay 370 receives its positive potential via cam-operated switch 380. In this modification, both of switches 368 and 374 are connected directly to ground, with the latter forming a relay holding circuit. De-energization of relay 370 is accomplished by cam 381 opening switch 380 at the end of a cycle, for example during the last 10° thereof, as shown in Figure 6. Operation of the circuitry is otherwise the same as above described.

When switch arm 208C is in position b, and switch 61 is in its "advance" position 61A, a complete circuit from the positive potential applied to switch 210 at terminal 213 is made to ground via the "advance" bus bar 358 and the normally closed switch part 362 when switch 210 is closed. Additionally, even before the closure of switch 210, a complete circuit to ground is made through the coil of relay 370. The consequent connection of line 288 to ground causes an "advance" signal for operation of relay 292 in Figure 7 in the same manner as previously described. Further, before the closure of switch 210 in Figure 1, a paper advance is made in accordance with the setting of line spacing switch 61 and multiplication switch 81. Following this, the closure and release of switch 210 causes solenoid 216 to step arm 208C to position c.

In this position, arm 208C is connected to control switch 62. With this switch being in its "clear" position, connection thereof is made to ground through the normally closed switch 366. Consequently, when cam 212 closes switch 210, relay 216 is energized and the movement of armature 218 causes switch 366 to open momentarily, thereby breaking ground circuit for the coil of relay 216. De-energization of relay 216 causes arm 208C to step to its next position. This automatic advance is continued from position-to-position until there is a connection to the stepping switch of a control switch which is set to either its "hold" or "advance" position. Such automatic advance is relatively rapid, and all control switches in their "clear" positions are stepped-by before switch 210 reopens. Thus, only a small fraction of a machine cycle is required to step-by the unused switch columns in the format control keyboard of Figure 3.

Double pole switch 364, including normally closed switch 362 and normally open switch 384, corresponds to the "clear control" push button 91 in Figure 3. Depressing push button 91 actuates switch 364. The normally open switch part 384 when closed, completes a circuit from coil 214 to arm 208D of bank D of the multi-gang stepping switch. All the terminal positions of gang D, except the last position 386, are interconnected and are further coupled by line 388 to the "clear" bus bar 360. Therefore, when switch 384 is closed and cam 212 closes switch 210, switch arm 208D steps from one position to the next continuously by virtue of switch 366 being momentarily open each time solenoid 216 is energized. The stepping function continues until switch arm 208D reaches position 386. Since this position is not connected to ground through switch 366, no further stepping of switch arm 208D is automatically effected. Position 386 is, however, coupled to ground by the coil of relay 388. This causes closure of relay switch 390 when arm 208D is on position 386. A positive potential is thereby applied to lamp 392 which corresponds to the "clear" indicator 93 in Figure 3.

It is to be noted that position 386 of gang D may be the equivalent of position j of the other gangs, or may be an additional position not corresponding to any position on the other gangs. In either event, each of the gangs remains on its last position until the "clear control" 91 of Figure 3 is released or cam-operated switch 210 opens, whichever occurs first. Upon being de-energized, each of the gangs of stepping switch 208 advances to its a position, which corresponds to the "home" column 90 in Figure 3.

When the printing device is such that both printing and multiplication cannot occur during the same cycle, so as to cause the need of switch 308 in Figure 5, another bank or gang E may be employed with the stepping switch for purposes of opening switch 308 at such times. Switch arm 208E is operated by armature 218 of relay 216 in such a manner that it steps in synchronism with each of the other switch gangs from positions a through j respectively. To cause operation of switch 308 in Figure 5, each of the control switches 60—69 of Figure 3 may comprise a double pole switch. For purposes of brevity, only one such double pole switch is shown and this includes switch 62 and switch 62'. The latter has three positions, but only the center one, 62'H, is electrically connected. Whenever switch 62' is at its center position, meaning that printing is to occur for a given number of lines, relay 312 is energized when arm 208E is at position c. This causes opening of switch 308 in Figure 5. It is to be understood that in an embodiment of this type, each of the other terminal positions of gang E of the stepping switch will be connected through a relay to a second pole of each of the control switches in a manner similar to that explained for control switch 62. Each of the relays, when energized, opens switch 308 of Figure 5.

The foregoing description of an exemplary embodiment of this invention has been in relation to a printing device which accomplishes paper and platen advance only to the extent of the line spacing determined by the switches in row 56 in Figure 3 when printing is to occur during the same cycle; that is, the multiplication feature of this invention, as related to the described embodiment is inoperative during any cycle in which printing is to occur. However, it is to be understood that this is a limitation imposed only by the particular printing device selected to describe the invention, and that when the invention is employed with printing devices which employ a first cycle for causing spacing and a second cycle wherein printing occurs, multiplication during the spacing cycle may be employed so that printing can occur at line spaces determined both by the line spacing switches and the multiplication switches. The latter applies also when the cycle of operation of the printing device is sufficiently long to allow the multiplication feature of this invention to operate before printing begins.

Thus, it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus for selectively controlling the vertical spacing between successive printable lines effected by a printing device operating in response to signals from a data processing system comprising a platen rotatable in steps corresponding respectively to said lines, means including step selecting means adjustable to any one of a plurality of positions for rotating said platen one or more of a like plurality of steps at a given time in accordance with the adjustment of said step selecting means, an electrical switch manually settable to a plurality of positions corresponding respectively to the plurality of positions for said step selecting means, and adjustment means for causing said step selecting means to be in a position corresponding to the setting of said switch.

2. Apparatus as in claim 1 wherein there is means operating to lock the step selecting means when same is in any of its positions, and further including means for returning the step selecting means to a given position at predetermined times, said adjustment means comprising means coupled to the switch for unlocking said locking means and means responsive to the unlocking thereof for moving said step selecting means from said given position to said corresponding position.

3. Apparatus as in claim 2 and further including means coupled to said switch at a predetermined position corresponding to said given position of the adjustable means for positively preventing movement of the adjustable means when the switch is set to said predetermined position.

4. Apparatus as in claim 2 wherein the unlocking means includes a first solenoid and a second switch, the means responsive to the unlocking means including a second solenoid coupled to said second switch and having an armature coupled to said step selecting means, the adjustment means further including third and fourth switches disposed on said armature at spaced positions, each of said third and fourth switches being commonly coupled to said first solenoid and respectively coupled to two positions of the first mentioned switch, the arrangement being such that when the first mentioned switch is in one of said two positions, said first solenoid is energized to effect unlocking of the locking means and to effect energization of the second solenoid by said second switch whereby the step selecting means is urged from said given position until at least one of said third and fourth switches is operated by the movement of the armature of said second solenoid, the operation of one of said third and fourth switches being effective to de-energize the first solenoid and cause locking of the step selecting means at a position corresponding to the position in which the first mentioned switch is set.

5. Apparatus as in claim 4 and further including two synchronously rotating cams each having at least one switch associated therewith, the first of said cams being operative to close its associated switch at a given time to allow energization of said second solenoid when the switch associated with said first solenoid is operated, each of said third and fourth switches having first and second positions the first of each being connected respectively to said two positions of the first mentioned switch and the second of each being connected commonly with the switch associated with the second cam, the rotation of said second cam being such as to close its switch and at least conditionally energize said first solenoid for unlocking the step selecting means and allowing return of same to said given position.

6. Apparatus as in claim 5 and further including means coupled to the switch associated with the second cam for preventing return of the step selecting means to said given position except at given times even though the second cam operates its associated switch between said given times.

7. Apparatus as in claim 6 wherein the means for preventing return of the step selecting means to said given position includes relay means having a switch serially connected to the switch associated with said second cam, said relay being operated by said first cam to cause the switch associated with the relay to be closed at said given time.

8. Apparatus as in claim 1 and further including step multiplying means cooperating with said means including the step selecting means for causing rotation of said platen a number of steps equaling the number of steps determined by said switch times a predetermined number.

9. Apparatus as in claim 8 wherein the step multiplying means causes successive rotations of the platen, the number of successive rotations being equal to said predetermined number and each such successive rotation comprising the number of steps determined by said switch.

10. Apparatus as in claim 8 wherein the step multiplying means includes a second switch manually settable to a plurality of positions at least one of which designates multiplication by a given number greater than one, solenoidal means coupled to said one position of a multiply switch, a cam having the same number of lobes as said given number, a cam follower in contact with said cam, and means coupling the cam follower and solenoidal means to said means including the step selecting means for rotation of said platen each time the cam follower is in contact with one of said lobes to cause said successive rotations respectively when said second switch is set at said one position.

11. Apparatus as in claim 1 and further comprising a plurality of electrical switches including the first mentioned switch, each of said switches being manually settable to a plurality of positions corresponding respectively to the plurality of positions to which said step selecting means is adjustable, means for sequentially energizing said switches, the adjustment means being commonly coupled to said switches and the sequential energization thereof causing said step selecting means to be in a position corresponding to the setting of an energized switch.

12. Apparatus as in claim 11 and further including step multiplying means coupled with said means including step selecting means and comprising a second plurality of switches each manually settable to a plurality of positions, means for sequentially energizing the second plurality of switches in synchronism respectively with the first plurality of switches, the second plurality of switches being effective to cause rotation of said platen a number of steps equaling the number of steps determined by the setting of an energized switch in said first plurality thereof times a predetermined number determined by the setting of a concurrently energized step multiplying switch.

13. Apparatus as in claim 12 wherein said predetermined number is greater than one, and wherein the step multiplying means includes a cam having the same number of lobes as said predetermined nut, a cam follower in contact with said cam, and means operatively coupled to each of said second plurality of switches, to said cam follower, and to said means including step selecting means for rotation of the platen each time the cam follower is in contact with one of said lobes while an energized one of the second plurality of switches is set in a position corresponding to the greater than one number.

14. Apparatus as in claim 11 and further including a second plurality of switches each manually settable to a plurality of positions including a hold position and an advance position, means for sequentially energizing said second plurality of switches in synchronism with the first plurality of switches including a stepping solenoid, a first bus bar intercoupling each of the hold positions of the second plurality of switches, means including a second bus bar for coupling each of the advance positions of the second plurality of switches to a reference potential, means for applying a potential to said solenoid at predetermined times, and means for connecting said first bus bar directly to said reference potential in response to a signal from said data processing system, the arrangement being such that application of a potential to said solenoid changes the energization from one to another switch in the first plurality thereof and from one to another switch in the second plurality thereof when said one switch in the second plurality thereof is set in a hold position and said signal is received from the data processing system, while when said one switch in the second plurality thereof is in an advance position such change of energization is accomplished without the aid of said signal.

15. Apparatus as in claim 14 wherein each of the switches in said second plurality thereof includes a third position designated as a clear position, and further including a third bus bar intercoupling each of the clear positions, switch means coupled between said third bus bar and said reference potential and operative by said solenoid, the arrangement being such that any switch of the second plurality thereof when in its clear position and receiving energization causes said solenoid to effect energization of another set of switches of the first and second pluralities thereof.

16. Apparatus as in claim 14 and further including means for generating a signal indicative of one of said switches in the second plurality thereof being set in its advance position when energized, and means responsive to said last mentioned signal for returning said step selecting means to a given position only when said signal is present.

17. Apparatus for selectively controlling the vertical spacing between successive printable lines or groups thereof effected by a printed device operated in cycles and in response to signals from a data processing system comprising a platen rotatable in steps corresponding respectively to said lines, means including step selecting means adjustable to any one of a plurality of positions for rotating said platen one or more of a like plurality of steps at a given time in accordance with the adjustment of said step selecting means, three groups of switches, each switch being movable between a plurality of positions, the positions of the first group of switches corresponding respectively to the plurality of positions for said step selecting means, the positions of the second group of switches corresponding respectively to the number of times that said platen is to be rotated during a given cycle the number of steps determined by a switch in the first group thereof, the positions of said third group of switches being designated respectively as advance, hold and clear positions, adjustment means coupled to each of the switches in the first group thereof for causing said step selecting means to be in a position corresponding to the setting of a selected switch in said first group, the combination of one switch from each group thereof being a set of switches, there thereby being a plurality of sets of switches, means including a ganged stepping switch for selectively connecting the sets of switches to an associated potential respectively, thereby energizing each switch in a so connected set, said last mentioned means including a solenoid for stepping the stepping switch from one of its positions to another when actuated, means for applying a potential to said solenoid, step multiplying means including said second group of switches and further including means coupled with said means including the step switching means for causing rotation of said platen a number of steps equaling the number of steps determined by the setting of an energized switch in the first group thereof and also in a given set of switches times the number designated by the energized switch in said second group thereof and in said given set, means including switch means coupling each of the hold positions of said third group of switches to a reference potential, means coupling each of the advance positions of said third group of switches to said reference potential, means including second switch means coupling each of the clear positions of the third group of switches to said reference potential, said first mentioned switch means being operative in response to a signal from the data processing system, said second switch means being operative by said solenoid, and means including a clearing switch in the means coupling the advance positions to said reference potential for disconnecting the advance positions from said reference potential, the arrangement being such that the line spacing of said printing device is controlled by the settings of said groups of switches in such a manner that when a switch of the third group thereof is in its hold position the respective positions of the other two switches in the associated set determine the line spacing for a plurality of cycles of the printing device until a shift signal is received from the data processing system at which time a succeeding set of switches is energized, while when a switch in the third group is in its advance position the respective positions of other two switches in the associated set determine the line spacing for only one cycle of the printing device at the end of which time said solenoid is operated to cause advancement of the stepping switch to another set of switches.

References Cited in the file of this patent
UNITED STATES PATENTS

| | | |
|---|---|---|
| 1,951,517 | Maul | Mar. 20, 1934 |
| 2,584,817 | Sill | Feb. 5, 1952 |

UNITED STATES PATENT OFFICE

CERTIFICATE OF CORRECTION

Patent No. 2,944,651                                July 12, 1960

Donald H. Malcolm et al.

It is hereby certified that error appears in the printed specification of the above numbered patent requiring correction and that the said Letters Patent should read as corrected below.

Column 16, line 42, for "nut" read -- number --.

Signed and sealed this 4th day of April 1961.

(SEAL)
Attest:
ERNEST W. SWIDER
~~KARL H. AXLINE~~
Attesting Officer

ARTHUR W. CROCKER
Acting Commissioner of Patents